United States Patent [19]

Keat

[11] 4,246,122

[45] Jan. 20, 1981

[54] PREFILT DIRECTING IMPERMEABLE MEMBRANE OF VARYING FORCE EXERTION

[75] Inventor: Gordon S. Keat, Par, England

[73] Assignee: English Clays Lovering Pochin & Co. Ltd., St. Austell, England

[21] Appl. No.: 960,927

[22] Filed: Nov. 15, 1978

[30] Foreign Application Priority Data

Nov. 15, 1977 [GB] United Kingdom ............... 47536/77

[51] Int. Cl.³ ............................................. B01D 29/42
[52] U.S. Cl. .................................. 210/350; 210/405; 210/456; 100/211
[58] Field of Search ................ 210/349, 350, 351, 405, 210/456; 100/211

[56] References Cited

U.S. PATENT DOCUMENTS

| | | | |
|---|---|---|---|
| 3,387,630 | 6/1968 | Routson | 210/350 |
| 3,753,499 | 8/1973 | Gwilliam | 210/350 |
| 3,782,554 | 1/1974 | Gwilliam . | |
| 3,805,961 | 4/1974 | Clark et al. | 210/350 |
| 3,900,403 | 8/1975 | Randle et al. | 210/350 |

FOREIGN PATENT DOCUMENTS

46-6399 2/1971 Japan ....................... 210/351

Primary Examiner—Charles N. Hart
Assistant Examiner—David R. Sadowski
Attorney, Agent, or Firm—Weingram & Klauber

[57] ABSTRACT

A membrane pressure filter comprises a pressure chamber divided into non-intercommunicating first and second compartments by a substantially upright impermeable elastic membrane, said first compartment containing a filtering surface, and said impermeable elastic membrane either being constructed in a manner such that or co-operating with means such that, in use, when the material in said first compartment has a specific gravity which is greater than the specific gravity of the material in said second compartment, said membrane is constrained to adopt a shape such that the surface of the membrane opposite the filtering surface is substantially parallel to the filtering surface.

6 Claims, 4 Drawing Figures

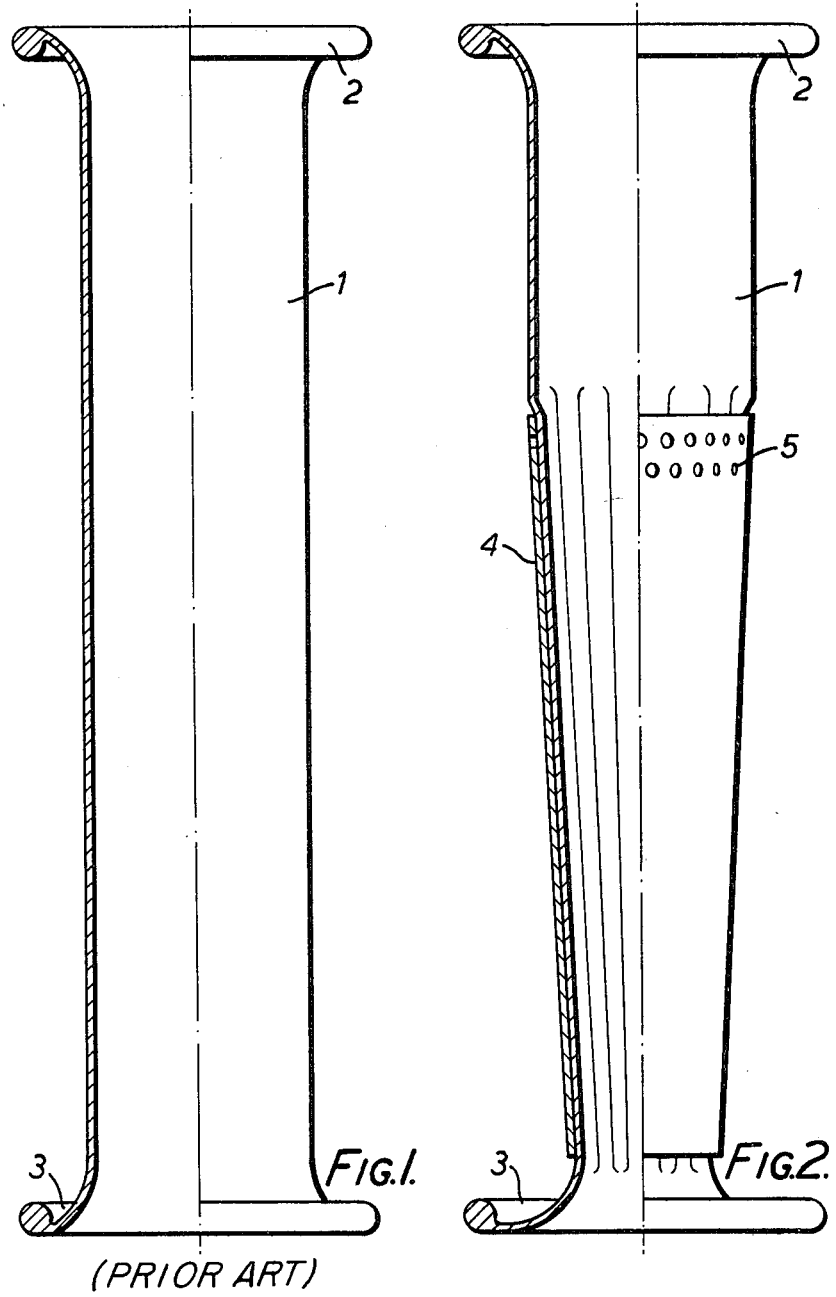

PREFILT DIRECTING IMPERMEABLE MEMBRANE OF VARYING FORCE EXERTION

BACKGROUND OF THE INVENTION

This invention relates to pressure filters and, more particularly, is concerned with pressure filters of the type in which high pressure is applied to a feed mixture of a liquid and a particulate solid by means of an elastic membrane, or diaphragm.

It is known that the higher the pressure which is applied to a feed mixture (comprising a mixture of liquid and particulate solid) in a pressure filter containing a filtering surface, the higher is the proportion of filtrate, i.e. liquid, which is forced through the filtering surface, and the drier is the filter cake, i.e. particulate solid, retained on the filtering surface. In conventional pressure filters the pressure is applied to the feed mixture directly by means of a rotary or reciprocating pump; but if it is desired to operate the pressure filter at a pressure greater than about 300 pounds per square inch it becomes uneconomic to apply pressure directly to the feed because the solid particles in the feed would cause serious wear problems in the moving and stationary parts of any high pressure pump used for the purpose.

There have therefore been developed in recent years a type of pressure filter which uses an elastic membrane, or diaphragm, to transmit pressure from a hydraulic fluid free of solid particles to the feed mixture of liquid and particulate solid to be pressure filtered. The pump used for generating the high pressure therefore comes into contact only with a "clean" liquid and the wear problem is considerably reduced. Generally, a pressure filter incorporating an elastic membrane, or diaphragm, comprises a pressure vessel, the inside of which is divided by the elastic membrane into two compartments, one compartment being for the hydraulic fluid and the other compartment being for the feed mixture (which comprises liquid and particulate solid) and including a filtering surface which is permeable to the liquid but impermeable to the particulate solid of the feed mixture. Such a pressure filter, which is referred to herein as "a membrane pressure filter", can be constructed so that the filtering surface and the surface of the membrane are parallel and either planar or curved; but it is in general more advantageous to provide a substantially cylindrical filtering surface and a coaxial, cylindrical membrane, because this configuration generally provides a more favourable ratio of filtering surface area to volume of the pressure vessel required to contain the filtering surface, its supporting structure and membrane. A membrane pressure filter of this latter type is conveniently referred to as a "tubular membrane pressure filter". Various kinds of tubular membrane pressure filter have been described, see for example British Pat. Nos. 907,485; 1,194,676; 1,240,465 and 1,271,494 and U.S. Pat. No. 3,900,403.

One kind of tubular membrane pressure filter comprises a pair of generally tubular, coaxial, inner and outer assemblies arranged one within the other and adapted to be supported in a generally upright position, an elastic membrane in the form of an impermeable elastic sleeve disposed within and secured at each end to the outer tubular assembly, a filtering surface in the form of a filter element disposed around and supported by the inner tubular assembly, outlet means for the discharge from the interior of the inner tubular assembly of filtrate (i.e. liquid) which has passed through the filter element and through apertures in the inner tubular assembly, and means for displacing the tubular assemblies axially relative to one another between first and second positions, the arrangement being such that in the first position of said tubular assemblies they co-operate with each other to define an annular chamber which is closed and divided into coaxial and non-intercommunicating inner and outer compartments by said impermeable elastic sleeve, the inner compartment having an inlet for a feed mixture (comprising a mixture of liquid and particulate solid to be separated) and the outer compartment having an inlet for hydraulic fluid under pressure, and in the second position of said tubular assemblies said annular chamber is open to enable particulate solid to be discharged from the inner compartment. Hereinafter such a tubular membrane pressure filter will be referred to as "a tubular membrane pressure filter of the kind set forth".

One problem which exists with membrane pressure filters is that, in all cases other than that in which the filtering surface is substantially horizontal, unless the specific gravity of the material constituting the hydraulic fluid is substantially the same as that of the material constituting the feed mixture, the heavier material exerts a higher pressure on the lower parts of the elastic membrane than the lighter material with the result that the elastic membrane is forced to expand into the compartment occupied by the lighter material until the force due to the difference in the hydrostatic pressure acting on the two sides of the membrane is balanced by the tensile force due to the expansion of the membrane. As a general rule, the larger the elastic membrane the greater will be the change in the dimensions of the elastic membrane before the force due to the difference in the hydrostatic pressure balances the tensile force in the elastic membrane. For example, in the case of an elastic membrane in the form of a cylindrical rubber sleeve, as may be used in a tubular membrane pressure filter, the greater the diameter of the sleeve the greater will be the increase in the circumference of the sleeve. The expansion of the elastic membrane into the compartment occupied by the lighter material brings with it the problem that the surface of the elastic membrane is no longer parallel to the filtering surface. Consequently, as the hydrostatic pressure of the hydraulic fluid is increased in order to express the liquid through the pores of the filtering surface one part of the membrane approaches very close to, and may finally touch, the filtering surface thus effectively preventing any further filtration at that part of the filtering surface, while other parts of the elastic membrane remain at a considerable distance from the filtering surface throughout the filtering operation so that a thick layer of filter cake is formed in those parts. The resultant filter cake of varying thickness is difficult to discharge and its formation represents inefficient use of the pressure filter.

One solution to the problem outlined above is to use a hydraulic fluid, the specific gravity of which differs from the specific gravity of the feed mixture by only a small amount (see British Pat. No. 1,240,466). However this solution to the problem suffers from the disadvantage that hydraulic fluids of specific gravity substantially higher than that of water are expensive and often difficult to handle. Also, the specific gravity of the feed mixture may vary widely over a relatively short time interval so that it is impossible to keep the difference between the specific gravities of the materials within the desired limits.

SUMMARY OF THE INVENTION

According to the present invention there is provided a membrane pressure filter which comprises a pressure chamber divided into non-intercommunicating first and second compartments by a substantially upright impermeable elastic membrane, said first compartment being provided with an inlet for a feed mixture to be pressure filtered (comprising liquid and particulate solid) and containing a filtering surface, and said second compartment being provided with an inlet for a hydraulic fluid, wherein said impermeable elastic membrane is either constructed in a manner such that or co-operates with means such that, in use, when the material in said first compartment has a specific gravity which is greater than the specific gravity of the material in said second compartment, said membrane is constrained to adopt a shape such that the surface of the membrane opposite the filtering surface is substantially parallel to the filtering surface.

When the specific gravity of the feed mixture in the first compartment i.e. on one side of the membrane of a membrane pressure filter, is significantly greater than the specific gravity of the hydraulic fluid in the second compartment, i.e. on the other side of the membrane, the lower portion of the elastic membrane is restrained in accordance with the present invention from expanding too far into the second compartment which is occupied by the less dense of the two materials.

In one embodiment of the invention the desired effect is achieved by reducing the effective horizontal linear dimension of the membrane, when unstressed, in the region in which the undesirable expansion would be most severe. This can be done either by providing a membrane which itself has a smaller unstressed horizontal linear dimension in the region in which the undesirable expansion would be most severe, or by providing an elastic restraining band which abuts or lies closely adjacent to, but is not attached to, the membrane and which effectively prevents the membrane from expanding to the extent to which it would expand in the absence of the restraining band. The region in which the undesirable expansion would be most severe is usually the lower region of the pressure filter.

If the filtering surface of the membrane pressure filter is substantially planar the elastic membrane may have an unstressed horizontal width which is smaller in the region in which the undesirable expansion would be most severe than in other regions. Preferably the membrane is made so that the unstressed width in the horizontal direction varies from top to bottom according to the magnitude of the undesirable expansion. For example, the unstressed horizontal width may be least at the bottom of the membrane and may increase towards the top. Alternatively a substantially rectangular restraining band can be provided in the region in which the undesirable expansion would be most severe and on the side of the membrane which is in contact with the less dense of the two materials. The restraining band is prestressed and secured at its two ends at or near the means for anchoring the side edges of the membrane. The presence of the prestressed band lying closely adjacent to the membrane prevents the membrane from expanding into the compartment which is occupied by the less dense material to the extent to which it would expand in the absence of the restraining band.

If the filtering surface of the membrane pressure filter is substantially cylindrical (as is usually the case with tube pressure filters), the membrane may be of frusto-conical or partly cylindrical and partly frusto-conical form, having a larger unstressed diameter at the top than at the bottom. The differences between the diameters at the top and bottom depends upon the difference between the specific gravities of the fluids in the two compartments, the vertical height of the compartments and the thickness and elastic properties of the material of the membrane. Alternatively, the elastic membrane can be substantially cylindrical but surrounded, in the region in which the undesirable expansion would be most severe, by an annular restraining band which has an unstressed diameter smaller than the unstressed diameter of the elastic membrane. The annular restraining band reduces the effective diameter of the elastic membrane in the region in which the undesirable expansion would be most severe. When the membrane is unstressed, the restraining band causes the elastic membrane to adopt a pleated or corrugated form but when the elastic membrane is drawn back under vacuum against the inside wall of the outer tubular body the corrugations or pleats are smoothed out and so do not reform when hydraulic pressure is applied. The restraining band may be relatively narrow and cylindrical and may surround only the region in which the undesirable expansion would be most severe, but preferably the restraining band is frusto-conical and surrounds a substantial portion of the membrane, for example from the bottom to about the mid-point of the membrane or above. The diameter of such a frusto-conical band varies from considerably less than the unstressed diameter of the membrane at the bottom to the same as, or only a little less than, the unstressed diameter of the membrane at the top of the band. The elastic membrane for the known types of tubular membrane pressure filter often has a bell-shaped end to facilitate the securing of the ends of the membrane to the outer tubular body and, in order to pull the restraining band over one of the bell-shaped ends, the restraining band is preferably provided with a plurality of holes or slots, which enable the restraining band to stretch to a greater degree under the action of a given tensile force.

It may be desirable or necessary to provide for use with the elastic membrane two or more restraining bands of different dimensions in order to accommodate variations in the difference between the specific gravities of the two fluids in the first and second compartments of the membrane pressure filter.

All the above arrangements serve to increase the force which opposes the expansion of the elastic membrane into the compartment occuped by the less dense material.

For a better understanding of the invention, and to show more clearly how the same may be carried into effect, reference will now be made, by way of example, to the accompanying drawings, in which:

FIG. 1 shows, partly in longitudinal section, an elastic membrane of known design, for use in a tubular membrane pressure filter of the kind set forth;

FIG. 2 shows, partly in longitudinal section, one embodiment of an elastic membrane as used, in accordance with the invention, in a tubular membrane pressure filter of the kind set forth;

The known elastic membrane shown in FIG. 1 consists of a cylindrical elastic sleeve 1 with bell-shaped end portions 2 and 3 for securing the elastic membrane to the outer tubular assembly of a tubular membrane pressure filter.

The elastic membrane shown in FIG. 2 also consists of a cylindrical elastic sleeve with bell-shaped end portions 2 and 3, but in this case the major part of the cylindrical sleeve is now surrounded by a restraining band 4 of frusto-conical shape, which makes the corresponding part of the cylindrical elastic sleeve adopt a pleated or corrugated configuration. The upper part of the restraining band is provided with a plurality of one inch diameter holes 5.

Figure 3:
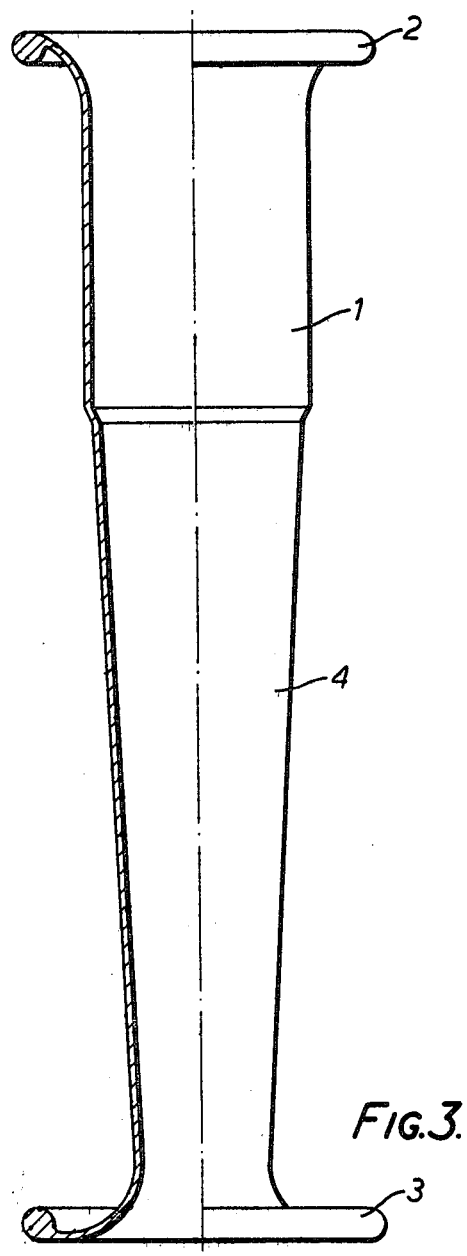
FIG. 3 shows, partly in longitudinal section, a second embodiment of an elastic membrane as used, in accordance with the invention, in a tubular membrane pressure filter of the kind set forth.

The elastic membrane shown in FIG. 3 consists of an upper portion 1 which is of cylindrical shape and a lower portion 4 which is of frusto-conical shape.

Figure 3A:
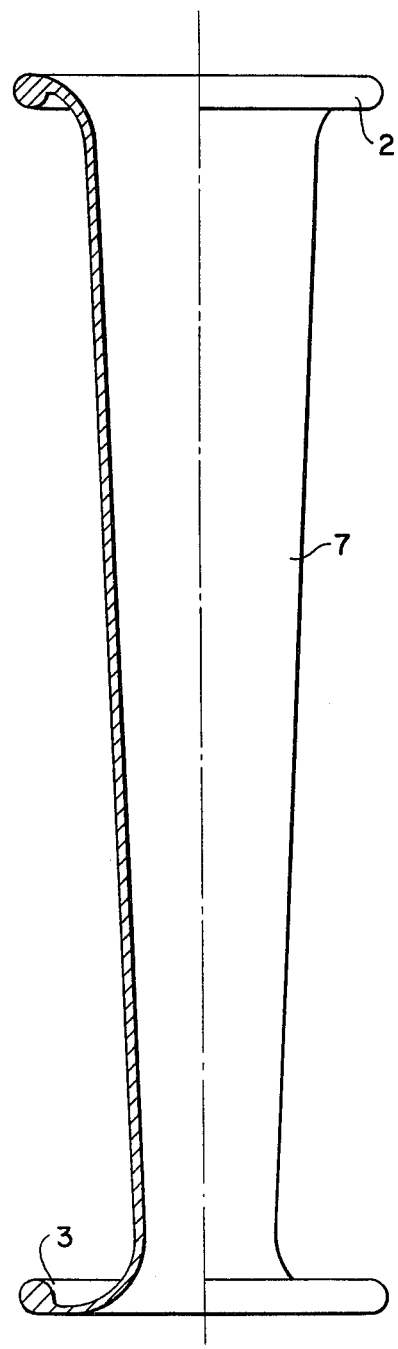
FIG. 3A shows, partly in longitudinal section, a third embodiment of an elastic membrane as used, in accordance with the invention, in a tubular membrane pressure filter of the kind set forth.

The elastic membrane 7 shown in FIG. 3A is similar to that shown in FIG. 3 but is of frusto-conical shape between end portions 2 and 3.

Figure 4:
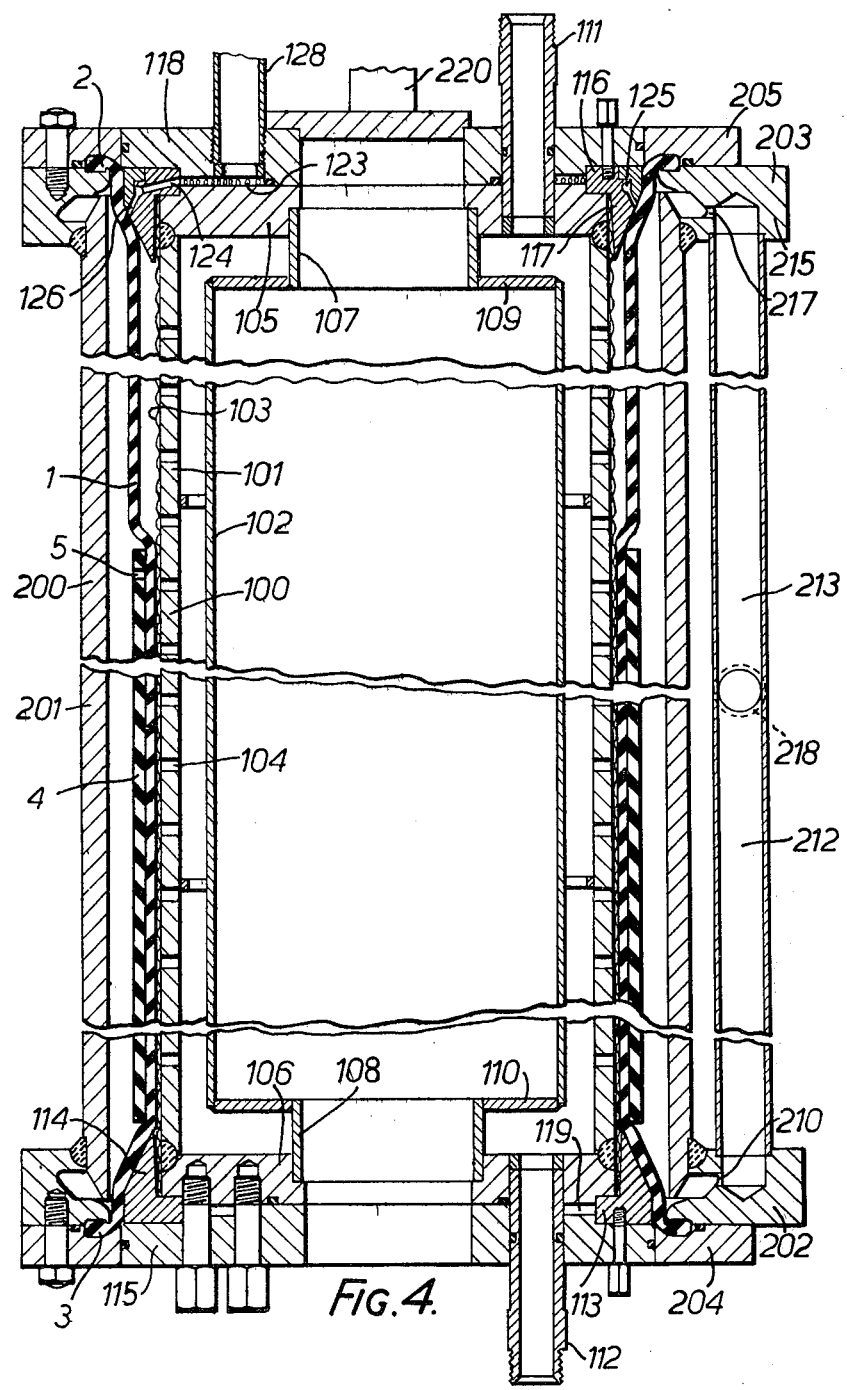
FIG. 4 shows, in longitudinal section, a tubular membrane pressure filter of the kind set forth incorporating the elastic membrane shown in FIG. 2.

FIG. 4 shows one embodiment of the invention in which a tubular membrane pressure filter of the kind set forth (more particularly as described in Application Ser. No. 874,847) is fitted with an elastic membrane as shown in FIG. 2. The tubular membrane pressure filter shown in FIG. 4 has an inner tubular assembly 100 and an outer tubular assembly 200. The inner tubular assembly includes two substantially concentric cylindrical members 101 and 102. The cylindrical member 101 has an overall diameter of 406 mm an overall length of 3.05 m; it constitutes the cylindrical central section of the inner tubular assembly and acts as a support for a filter element 103; and it is provided with a plurality of apertures 104 which allow filtrate (which has passed through the filter element 103) to enter the interior of the cylindrical member 101. The filter element 103 conveniently comprises a cylinder of wire mesh, which fits closely over the cylindrical member 101, and a filter cloth sleeve which fits tightly over the wire mesh cylinder.

To the upper and lower ends of the cylindrical central member 101 there are attached upper and lower end sections of the inner tubular assembly. These end sections are formed by closing the upper and lower ends of the cylindrical member 101 by circular plates 105 and 106, respectively, each of which plates is provided with a central hole which accommodates an end of one of two cylindrical collars 107 and 108, the other end of each of the collars fitting into central holes provided in circular end plates 109 and 110 which close the ends of the cylindrical member 102. An upper inlet pipe 111, for compressed air, and a lower outlet pipe 112, for filtrate, pass respectively through end plates 105 and 106 and communicate with the space between cylindrical members 101 and 102. The cylindrical member 102 is sealed and is provided so as to decrease the internal volume of member 101 which must be filled with compressed air before the pressure therein rises sufficiently to detach filter cake from the outer surface of the filter element 103. Secured to plate 106 by means of a plurality of stud bolts is an inner end member 113 which incorporates a fairing 114, and an outer end member 115. Similarly there is secured to plate 105 an inner end member 116 which incorporates a fairing 117, and an outer end member 118. Inner end member 113, outer end member 115 and plate 106 define between them a chamber 119. At the upper end of the tubular membrane pressure filter, inner end member 116, outer end member 118 and plate 105 define between them a central ante-chamber 123 which is provided with a plurality of radially-extending ducts 124 which lead to a toroidal chamber 125 and thence to an annular shot 126 through which a feed mixture can be fed to the inner, first compartment of the tubular membrane pressure filter.

The outer tubular assembly 200 comprises a cylindrical central section 201, and lower and upper end sections which comprise a lower flange portion 202 and an upper flange portion 203 both of which are welded to the central section 201, and a lower annular member 204 and an upper annular member 205 which are attached to the flange portions 202 and 203 respectively by stud bolts. Flange portion 202 and annular member 204 have cut into them specially shaped grooves so that they can accommodate and clamp between them the lower annular beading 3 of an impermeable elastic sleeve 1. Similarly the upper annular beading 2 of the impermeable elastic sleeve 1 is clamped between flange portion 203 and annular member 205. Flange portion 202 is provided with a bore 210 and a conduit 212 communicates with the bore 210. Similarly flange portion 203 is provided with a bore 217 which communicates with conduit 213. Approximately midway between the two flange portions 202 and 203 there is a substantially semi-circular manifold 218 which connects together the conduits 212 and 213 and is provided with an inlet/outlet which may be connected to a vacuum pump or to a pump supplying hydraulic fluid at low pressure or to a pump supplying hydraulic fluid at high pressure. The inner orifices of bores 210 and 217 discharge into the outer, second compartment of the tubular membrane pressure filter.

The inner tubular assembly 100 may be displaced vertically downwards relative to the outer tubular assembly 200 by means of a hydraulic ram 220 (which is mounted on a spider construction the feet of which are bolted to the upper annular member 205). The hydraulic ram 220 is provided with two inlet/outlet ports for hydraulic fluid at high pressure so that the inner tubular body may be raised or lowered by connecting the appropriate inlet/outlet port to the high pressure pump. When the tubular membrane pressure filter is in the position shown in FIG. 4 a seal is formed between the inner and outer tubular assemblies at the lower end by an O-ring seal, accommodated in a groove in the outer end member 115 of the lower end section, and at the upper end by an O-ring seal, accommodated in a groove in the outer end member 118 of the upper end section.

The inner and outer tubular assemblies together define an annular chamber which is divided into non-intercommunicating inner first and outer second compartments by means of the elastic sleeve 1.

The tubular membrane pressure filter described above was used to dewater an aqueous suspension of a kaolin clay. The aqueous suspension has a specific gravity of 1.2000, and the hydraulic fluid used was water of specific gravity 1.000. The elastic membrane 1, in the form of an impermeable elastic sleeve having bell-shaped ends 2 and 3 and a central cylindrical portion of unstressed outer diameter 432 mm was formed of natural rubber of thickness 6 mm. A restraining band 4 of frusto-conical shape and having a length of 2.13 m, a bottom outer diameter of 348 mm and a top outer diameter of 394 mm was formed of natural rubber of thickness 5 mm and was pulled over the lower part of the elastic membrane. Two rings of holes 5 of 25 mm diameter, and spaced about 75 to 100 mm apart, were formed in the upper part of the restraining band to facilitate the stretching of the band to pull it over one of the bell-shaped ends of the elastic membrane. The cake formed when the kaolin suspension was dewatered using the above arrangement had a substantially uniform thickness of about 12.5 mm.

By comparison the cake formed when the kaolin suspension was dewatered in the absence of the restraining band 4 varied in width from about 3 mm at the top to about 50 mm at the bottom which represents very inefficient use of the filtering surface area.

In a second embodiment of the invention the tubular membrane pressure filter was used to dewater an aqueous suspension of kaolin clay of specific gravity 1.2000, the hydraulic fluid being water of specific gravity 1.000. The elastic membrane was in the form shown in FIG. 3 consisting of an impermeable elastic sleeve with bell-shaped ends 2 and 3 of the same dimensions as those of the elastic sleeve described above, but the main body of the membrane consisted of an upper cylindrical portion 1 of length 915 mm and outer diameter 432 mm and a lower frusto-conical portion 4 of length 2.13 m, bottom outer diameter 373 mm and upper outer diameter 419 mm. The elastic membrane was formed of natural rubber of thickness 6 mm and a step or shoulder was formed in the region in which the cylindrical and frusto-conical portions joined. The cake formed when the kaolin suspension was dewatered using the above arrangement had a substantially uniform thickness of about 12.5 mm.

In a third embodiment of the invention the tubular membrane pressure filter was used to dewater an aqueous suspension of a kaolin clay, the aqueous suspension having a specific gravity of 1.200 and the hydraulic fluid being water of specific gravity 1.000. The elastic membrane was in the form of am impermeable elastic sleeve with bell-shaped ends of the same dimensions as those of the elastic sleeves described above, but the main body of the membrane consisted of an upper cylindrical portion of length 915 mm and outer diameter 421 mm and a lower frusto-conical portion of length 2.13 m, bottom outer diameter 356 mm and upper outer diameter 421 mm. The membrane was formed of natural rubber of thickness 6 mm and in this case there was not a step or shoulder but a smooth join between the cylindrical and frusto-conical portions. The cake formed when the kaolin suspension was dewatered using the above arrangement had a substantially uniform thickness of about 12.5 mm.

What is claimed is:

1. In a membrane pressure filter which comprises a pressure chamber divided into non-intercommunicating first and second compartments by a substantially upright impermeable membrane, said first compartment being provided with an inlet for a feed mixture to be pressure filtered and containing a filtering surface, and said second compartment being provided with an inlet for a hydraulic fluid; said hydraulic fluid having a lower density than said feed mixture, whereby when said feed mixture and said hydraulic fluid are provided to said compartments the lower portion of said membrane tends by virtue of the consequent pressure difference acting at said lower portion of said membrane to expand into said second compartment; the improvement comprising: means selectively acting upon said lower portion of said membrane during use thereof for generating counteracting forces of magnitude increasing from the top to bottom of said portion, for opposing said expansion of said membrane into said second compartment, and said means acting over at least half the effective length of said membrane, whereby said membrane is constrained to adopt a shape such that the surface of the membrane opposite the filtering surface is substantially parallel to the filtering surface.

2. Apparatus in accordance with claim 1, wherein said means comprises said lower portion of said membrane being conformed in its unstressed condition toward said filtering surface to provide reduced spacing between said membrane and filtering surface at said portion, whereby the said pressure difference acting against the side of said lower portion of said membrane in contact with said feed mixture displaces said membrane toward said second compartment, the resulting stresses generated in said membrane constituting said counteracting forces and constraining said membrane upon said substantially parallel relationship between said wall and filtering surface being attained.

3. A membrane pressure filter as claimed in claim 2 wherein said first compartment contains a substantially upright cylindrical filtering surface and wherein said impermeable elastic membrane is coaxial with said filtering surface and has a frusto-conical shape.

4. A membrane pressure filter as claimed in claim 2, wherein said first compartment contains a substantially upright cylindrical filtering surface and wherein said impermeable elastic membrane is co-axial with said filtering surface and has a partly cylindrical and partly frusto-conical shape.

5. Apparatus in accordance with claim 1, wherein said means comprises an elastic restraining band lying closely adjacent the side of said lower portion of said membrane which is in contact with said hydraulic fluid.

6. A membrane pressure filter as claimed in claim 5, wherein said first compartment contains a substantially upright cylindrical filtering surface and wherein said impermeable elastic membrane is coaxial with said filtering surface, is of cylindrical shape and cooperates with a said restraining band which has a frusto-conical shape.

* * * * *